US008989188B2

United States Patent
Udutha et al.

(10) Patent No.: US 8,989,188 B2
(45) Date of Patent: Mar. 24, 2015

(54) PREVENTING LEAKS AMONG PRIVATE VIRTUAL LOCAL AREA NETWORK PORTS DUE TO CONFIGURATION CHANGES IN A HEADLESS MODE

(75) Inventors: Sundeep Chandra Udutha, Milpitas, CA (US); Manohar Rapeti, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 13/468,311

(22) Filed: May 10, 2012

(65) Prior Publication Data

US 2013/0301425 A1  Nov. 14, 2013

(51) Int. Cl.
 *H04L 12/28* (2006.01)
 *H04L 12/46* (2006.01)
 *H04L 29/06* (2006.01)
(52) U.S. Cl.
 CPC ........... *H04L 12/467* (2013.01); *H04L 29/0653* (2013.01)
 USPC .......................................... 370/392; 370/409
(58) Field of Classification Search
 None
 See application file for complete search history.

(56) References Cited

U.S. PATENT DOCUMENTS 6,198,741 B1 * 3/2001 Yoshizawa et al. ........... 370/392
8,085,790 B2 12/2011 Klessig et al.
8,149,834 B1 * 4/2012 Nielsen et al. ................ 370/392
8,169,903 B2 5/2012 Oz et al.
8,644,188 B1 * 2/2014 Brandwine et al. ........... 370/254
2004/0160903 A1 * 8/2004 Gai et al. ...................... 370/254
2010/0061393 A1 * 3/2010 Wong ............................ 370/419

OTHER PUBLICATIONS

Cisco, "Cisco Nexus 1000V Series Switches", http://www.cisco.com/en/US/prod/collateral/switches/ps9441/ps9902/data_sheet_c78-492971.html retrieved from the Internet on May 10, 2012, pp. 1-19.

* cited by examiner

*Primary Examiner* — Ian N Moore
*Assistant Examiner* — Eric P Smith
(74) *Attorney, Agent, or Firm* — Edell, Shapiro & Finnan, LLC

(57) ABSTRACT

Techniques are provided for hosting a first virtual switch and one or more virtual machines (VMs) configured to be part of a virtual LAN (VLAN). The first virtual switch enables communications among the VMs arranged in one or more private VLANs (PVLANs). The first virtual switch receives a packet from a source VM that is evaluated for source identifier information associated and destination identifier information associated with a destination VM serviced by a second virtual switch for which the packet is destined. An evaluation result is obtained. Based on the evaluation result, the first virtual switch determines whether the source and destination VMs belong to a same PVLAN and drops the packet if the source VM and the destination VM do not belong to the same PVLAN.

14 Claims, 6 Drawing Sheets

133

| MAC ADDRESS | vNIC | PRIMARY VLAN | SECONDARY VLAN |
|---|---|---|---|
| xxxxx...xx1 | xx...1 | 1000 | 1001 |
| xxxxx...xx2 | xx...2 | 1000 | 1001 |
| xxxxx...xx3 | xx...3 | 1000 | 1002 |
| xxxxx...xx4 | xx...4 | 1000 | 1002 |
| xxxxx...xx5 | xx...5 | 1000 | 1003 |
| xxxxx...xx6 | xx...6 | 1000 | 1001 |
| xxxxx...xx7 | xx...7 | 1000 | 1001 |

FIG.3

PREVENTING LEAKS AMONG PRIVATE VIRTUAL LOCAL AREA NETWORK PORTS DUE TO CONFIGURATION CHANGES IN A HEADLESS MODE

TECHNICAL FIELD

The present disclosure relates to communications between virtual machines in a virtual local area network.

BACKGROUND

Local area networks (LANs) are networks of physical network devices (e.g., computers, servers, switches, etc.) located within a same area. Physical servers or client devices within a LAN are typically connected to one another by a bridge or switch device. These devices prevent packet collisions from travelling through devices within a particular LAN. Virtual LANs (VLANs) allow a network manager to logically segment a LAN into different broadcast domains using software on a physical switch or virtual switch hosted on one or more physical servers in a LAN. VLANs are configurable in physical switches as well as virtual switches hosted in the physical servers. The physical devices or client devices can be configured to be part of a VLAN. Additionally, VLANs can be further divided or segmented into secondary VLANs or private VLANs (PVLANs). PVLANs allow for virtual grouping or segregation of traffic between virtual devices hosted by one or more physical servers.

BRIEF DESCRIPTION OF THE DRAWINGS

FIG. 3 shows an example of a media access control (MAC) context database accessible by one of the virtual switches with mapping information for mapping primary and secondary VLAN associated with MAC addresses of the virtual machines.

DESCRIPTION OF EXAMPLE EMBODIMENTS

Overview

A method, apparatus and computer-readable storage media are provided for hosting, at a given physical server in a local area network (LAN) comprising a plurality of physical servers, a first virtual switch and one or more virtual machines configured to be part of a VLAN. The first virtual switch is configured to enable communications among the virtual machines which are arranged in one or more private VLANs (PVLANs). A packet is received at the first virtual switch from a source virtual machine at a virtual port associated with the source virtual machine. The packet is evaluated at the first virtual switch for source identifier information associated with the source virtual machine from which the packet originates and destination identifier information associated with a destination virtual machine serviced by a second virtual switch for which the packet is destined to obtain an evaluation result. Based on the evaluation result, it is determined whether the source virtual machine and the destination virtual machine belong to a same PVLAN based on the source identifier information and the destination identifier information. The packet is dropped at the first virtual switch if the determining indicates that the source virtual machine and the destination virtual machine do not belong to the same PVLAN.

Example Embodiments

Figure 1:
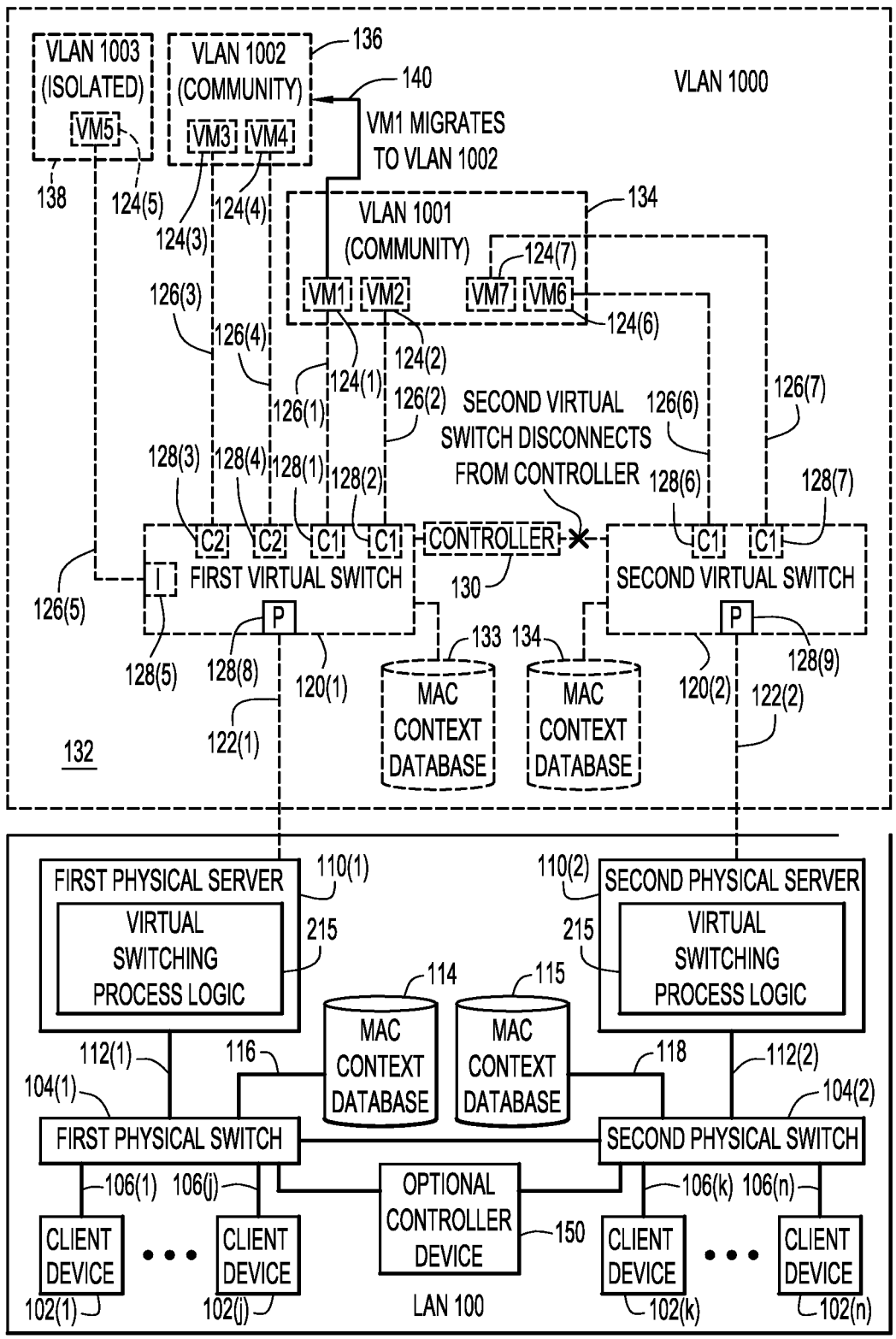
FIG. 1 shows an example topology depicting a local area network (LAN) of a plurality of physical servers, each of which is configured to host a plurality of virtual machines, virtual switches and a controller device.

The techniques described hereinafter are directed to managing data communications between virtual machines in a virtual local area network (VLAN). An example topology 100 is illustrated in FIG. 1. The topology 100 comprises a plurality of client devices 102(1)-102(n) in communication with one or more physical switches and physical servers arranged in a local area network (LAN) configuration. For example, as depicted in FIG. 1, a first group of client devices 102(1)-102(j) is connected to a first physical switch device (hereinafter "first physical switch"), shown at reference numeral 104(1), across corresponding physical links 106(1)-106(j). Likewise, a second group of client devices 102(k)-102(n) is connected to a second physical switch device (hereinafter "second physical switch"), shown at reference numeral 104(2), across corresponding physical links 106(k)-106(n). The first physical switch 104(1) and the second physical switch 104(2) are connected to each other across a physical link 108.

The first physical switch 104(1) is connected to a corresponding first physical server, shown at reference numeral 110(1), across a physical link 112(1). Likewise, the second physical switch 104(2) is connected to a corresponding second physical server, shown at reference numeral 110(2), across a physical link 112(2). Though FIG. 1 shows two physical switches and two physical servers, it should be appreciated that any number of physical switches and physical servers may be present in topology 100. Similarly, any number of client devices and physical links may also be present in FIG. 1. In one example, the physical links may be Ethernet links configured to connect the physical devices.

As stated above, the client devices, physical switches and physical servers are arranged in a LAN (depicted as LAN 100 at reference numeral 113). It should be appreciated that there may be multiple LANs in topology 100, and LAN 100 is shown as an example. Each of the devices in the LAN is configured with a network interface card (NIC) (e.g., an Ethernet card) that is associated with a corresponding media access control (MAC) address. These MAC addresses operate as identifiers for each of the devices in the LAN. The MAC addresses are stored in MAC context databases, which are shown at reference numerals 114 and 118. The MAC addresses can be stored in the MAC context databases 114 and 115 dynamically from packets received by the first physical switch 104(1) and the second physical switch 104(2). Additionally, MAC addresses can be stored in the MAC context databases 114 and 115 statically by being inserted by a user or network administrator. The first physical switch 104(1) is configured to access the MAC context database 114 across physical link 116 and the second physical switch 104(2) is configured to access the MAC context database 115 across physical link 118. For example, the first physical switch 104(1) and the second physical switch 104(2) map data packets of data communications to appropriate devices in the LAN 100. In one embodiment, the MAC context databases 114 and 115 may be stored in memory residing in the first physical switch 104(1) and the second physical switch 104(2), respectively, such that the first physical switch 104(1) and second physical switch 104(2) are able to access and update the MAC context databases 114 and 115 locally.

In one example, the first physical switch 104(1) and the second physical switch 104(2) are "Layer 2" switches, as defined by the Open Systems Interconnection (OSI) model. Thus, to enable data packet communications between the devices in the LAN 100, the first physical switch 104(1) and the second physical switch 104(2), operating as Layer 2 switches, access the MAC context databases 114 and 115, respectively, to determine source and destination MAC addresses associated with respective source and destination network devices involved in the data communications.

For example, the client device 102(1) may attempt to send a data packet to client device 102(k). This data packet, for example, may be a unicast packet sent from a source client device 102(1) and intended for a destination client device 102(k). For example, when the first physical switch 104(1) is aware (by virtue of accessing the MAC context database 114) of the destination MAC address associated with the destination client device 102(k), the unicast packet may be sent from the source client device 102(1) to the destination client device 102(k). The data packet may also be a broadcast or multicast packet, as commonly understood.

The data packet contains a source MAC address that identifies the NIC of the source client device 102(1) as well as a destination MAC address that identifies the NIC of the destination client device 102(k). As stated above, these MAC addresses are statically or dynamically stored in the MAC context databases 114 and 115. In order for the packet to be sent from the client device 102(1) to the client device 102(k), the packet has to pass through the first physical switch 104(1) and the second physical switch 104(2). The first physical switch 104(1) and the second physical switch 104(2) can analyze the packet to obtain the source MAC address and the destination MAC address and can route or forward the packet to the appropriate network device based on the mapping information in the MAC context database 114. It should be appreciated that the first physical switch 104(1) and the second physical switch 104(2) may be physical switches other than "Layer 2" switches, but for simplicity, these physical switches are described as Layer 2 switches hereinafter.

The topology 100 also depicts a plurality of "virtual" devices that may be hosted by the first physical server 110(1) and the second physical server 110(2). All of the "virtual" devices and "virtual" connections depicted in FIG. 1 may be hosted, for example, on hardware or software components of the first physical server 110(1) and the second physical server 110(2), as described hereinafter. For simplicity, physical components in topology 100 are depicted with solid lines, while "virtual" components are depicted with dashed lines.

The first physical server 110(1) and the second physical server 110(2) each are configured to host virtual switching process logic 215 for the virtual devices hosted by the physical servers. This logic is described in detail, hereinafter. Additionally, the first physical server 110(1) may host a first virtual switch 120(1) across a first virtual link 122(1). Likewise, the second physical server 110(2) may host a second virtual switch 120(2) across a second virtual link 122(2). The first physical server 110(1) and the second physical server 110(2) are also configured to host a plurality of virtual machines (VMs), each of which is virtually connected to one of the virtual switches. The virtual switches may also be referred to as "virtual Ethernet modules" or (VEMs). The VMs are depicted at reference numerals 124(1)-124(7). For example, the VMs hosted by the first physical server 110(1) are virtually connected to the virtual switch that is hosted by the first physical server 110(1) (e.g., the first virtual switch 120(1)), and the VMs hosted by the second physical server 110(2) are virtually connected to the virtual switch that is hosted by the second physical server 110(2) (e.g., the second virtual switch 120(2)). It should be appreciated that the first physical server 110(1) and the second physical server 110(2) may host any number of virtual switches and virtual machines.

For example, in FIG. 1, the first physical server 110(1) is configured to host VM1-VM5, shown at reference numerals 124(1)-124(5), respectively. The second physical server 110 (1) is configured to host VM6 and VM7, shown at reference numerals 124(6) and 124(7), respectively. Each of the VMs 124(1)-124(7) are virtually connected to a corresponding virtual switch at a virtual port at the corresponding virtual switch. For example, VM1 124(1) is virtually connected to the first virtual switch 120(1) across virtual link 126(1) at virtual port 128(1), VM2 124(1) is virtually connected to the first virtual switch 120(1) across virtual link 126(2) at virtual port 128(2), and so on such that each of the VMs 124(1)-124 (7) is connected to a corresponding virtual port 128(1)-128(7) across a corresponding virtual link 126(1)-126(7). The virtual links 126(1)-126(7) between the virtual switches and the VMs 124(1)-124(7) may be, for example, virtual links.

The first virtual switch 120(1) also has a port 128(8) that is configured to interface with the first physical server 110(1) across the virtual link 122(1) Likewise, the second virtual switch 120(2) has a port 128(9) that is configured to interface with the second physical server 110(2) across the virtual link 122(2). The ports 128(8) and 128(9) are physical ports of the first physical server. For example, ports 128(8) and 128(9) are physical Ethernet ports on the first physical server 110(1) and the second physical server 110(2), respectively, that are configured to send and receive Ethernet communications.

The physical servers are also configured to host a virtual supervisor module (VSM) (also referred to herein after as a "virtual controller device," "virtual controller," "controller" or "VSM"). For example, as shown in FIG. 1, the virtual controller device is shown at reference numeral 130. The controller 130 may be hosted by either the first physical server 110(1) or the second physical server 110(2). Alternatively, the controller 130 may be hosted on another physical device in topology 100 which is enabled with layer 2 and/or layer 3 connectivity. The controller 130 is configured to interface virtually or control each of the first virtual switch 120(1) and the second virtual switch 120(2).

Each of the virtual devices, including the VMs 124(1)-124 (7), are arranged in a primary VLAN, depicted as VLAN 1000 at reference numeral 132. That is, the VMs 124(1)-124(7) may be configured to exchange communications (e.g., data packets) with each other within VLAN 1000 according to the techniques described hereinafter. Each of the virtual devices in the VLAN 1000 has a corresponding virtual NIC (vNIC) (e.g., a virtual Ethernet identifier) that is associated with a corresponding unique MAC address. These MAC addresses operate as identifiers for each of the virtual devices in the VLAN 1000. The MAC address for these virtual devices is stored in a first virtual MAC context database, shown at reference numeral 133 and a second virtual MAC context database, shown at reference numeral 134. The virtual MAC context database 133 may be stored on the first virtual switch 120(1) and the virtual MAC context database 134 may be stored on the second virtual switch 120(2). Similar to the MAC context databases 114 and 115, the virtual MAC context databases 133 and 134 may be updated dynamically or statically. Additionally, the controller 130 may be used to update the virtual MAC context databases 133 and 134 by receiving MAC address information from the first virtual switch 120(1) and passing this MAC address information to the second virtual switch 120(2). Thus, as described hereinafter, when a source VM intends to send data communications to a destination VM, the appropriate virtual switches can evaluate the packet to obtain source identifier information (e.g., a MAC address associated with the source VM corresponding to the vNIC of the source VM) and destination identifier information (e.g., a MAC address associated with the destination VM corresponding to the vNIC of the destination VM). If appropriate, the virtual switches can route or forward the packet to the destination VM based on the mapping information available in the virtual MAC context database 133.

It should be appreciated that the virtual MAC context database 133 and the virtual MAC context database 133 may reside in a memory of the first physical server 110(1) and the second physical server 110(2), respectively. For example, the virtual MAC context databases 133 and 134 may reside in the MAC context databases 114 and 115, respectively. Additionally, it should be appreciated that the vNICs associated with each virtual device in VLAN 1000 may be associated with the NIC corresponding to the appropriate physical server that hosts the virtual devices. That is, the first physical server 110(1) may contain mapping information that maps the NIC of the first physical server 110(1) with the vNICs of the virtual devices hosted by the first physical server 110(2). Likewise, the second physical server 110(2) may contain mapping information that maps the NIC of the second physical server 110(2) with the vNICs of the virtual devices hosted by the second physical server 110(2).

In addition to residing within the primary VLAN 1000, the VMs 124(1)-124(7) may be sub-divided into secondary VLANs within the primary VLAN 1000. These secondary VLANs are also known as private VLANs (PVLANs). FIG. 1 shows three secondary VLANs/PVLANs within VLAN 1000: secondary VLAN or PVLAN 1001, at reference numeral 134; secondary VLAN or PVLAN 1002, at reference numeral 136; and secondary VLAN or PVLAN 1003, at reference numeral 138.

VMs 124(1)-124(7) are each assigned to a particular PVLAN based on the port configuration of a corresponding virtual port to which each of the VMs is assigned. Each virtual port for the first virtual switch 120(1) and the second virtual switch 120(2) may be classified as a particular "type" or "category" of virtual port. These virtual ports may be classified based on the VLANs that are associated with the port (e.g., incoming traffic associated with VLANs). Such classification indicates the primary VLAN and secondary VLAN to which a VM connected to the virtual port belongs. Thus, each virtual port has an identifier that associates the virtual port with two VLANs: the primary VLAN (e.g., VLAN 1000) to which all of the virtual devices in FIG. 1 belong and the secondary VLAN (e.g., one of PVLANs 1001-1003) to which a particular virtual device belongs.

For example, the virtual ports 128(1)-128(7) may be characterized or classified as a "community" virtual port or an "isolated" virtual port. Additionally, ports 128(8) and 128(9) maybe classified as a "promiscuous" virtual port with or without trunking options enabled. A community virtual port is configured to service a VM within a "community" secondary VLAN/PVLAN. VMs that are assigned to community virtual ports are configured to send data communications only to other VMs residing within the same community PVLAN (e.g., serviced by other virtual ports associated with the same community PVLAN). These VMs are prohibited from sending data communications to VMs that reside in other community PLVANs.

An isolated virtual port is configured to service a VM within an "isolated" secondary VLAN/PVLAN. VMs that are assigned to isolated virtual ports are not allowed to send data communications to any VMs that reside in other community PVLANs or isolated PVLANs (including VMs that reside in the same isolated PVLAN). Additionally, in one example, only one secondary isolated PVLAN can be assigned within a primary VLAN.

A promiscuous port is configured to service any device (physical or virtual) that resides within the same primary VLAN (e.g., VLAN 1000). Furthermore, trunking enables packets sent and received on secondary VLANs to be "trunked" such that they are carried only on primary VLANs. Thus, network devices that are associated with a promiscuous port can send and receive communications to and from any device, so long as that device resides in the same primary VLAN (e.g., VLAN 1000).

As stated above, each of the virtual switches is classified as having a primary VLAN and a secondary VLAN. Thus, network devices with a corresponding promiscuous port can communicate with all network devices within VLAN 1000. Network devices with a corresponding community virtual port can send and receive communications only to other devices in the same community and to devices with promiscuous ports. Network devices with a corresponding isolated virtual port have complete separation (e.g., Layer 2 separation) and can communicate only with devices having promiscuous ports.

In FIG. 1, VM1 124(1), VM2 124(2), VM6 124(6) and VM7 124(7) have corresponding community virtual ports that service VLAN 1001. Thus, these VMs reside in the primary VLAN 1000 and the secondary VLAN (community) 1001. VM3 124(3) and VM4 124(4) have corresponding community virtual ports that service VLAN 1002. Thus, these VMs reside in the primary VLAN 1000 and the secondary VLAN (community) 1002. VM5 124(5) has a corresponding isolated virtual port, and thus, VM5 124(5) resides in the primary VLAN 1000 and the secondary VLAN (isolated) 1003. A VM may migrate to another PVLAN by changing its corresponding virtual port. Arrow 140 shows an example of VM1 124(1) migrating from PVLAN 1001 to PVLAN 1002, for example, by associating VM1 124(1) with a new virtual port configured to service PVLAN 1002. The virtual MAC context databases 133 and 134 updates any VM migrations or new PVLAN configurations.

The virtual switches are configured to monitor communications between VMs to ensure that VMs are receiving only authorized communications from other VMs. As commonly understood, data communications may be sent between the VMs within the primary VLAN 1000 or within corresponding PVLANs. For example, VMs residing within PVLAN 1001 can send data communications to corresponding virtual switches by sending these communications in PVLAN 1001, VMs residing within PVLAN 1002 can send and receive data communications to corresponding virtual switches by sending these communications in PVLAN 1002, and so on. The first virtual switch 120(1) and second virtual switch 120(2) can send data communications to each other (e.g., via their corresponding physical servers) by sending communications in the primary VLAN 1000. For example, the physical servers 110(1) and 110(2) which host the virtual switches 120(1) and 120(2) can send these data communications to each other in VLAN 1000, which resides within LAN 100 by virtue of configuring the uplink as a regular trunk. In one example, the physical links in LAN 100 are configured as a part of the primary VLAN and secondary VLANs in topology 100.

Figure 2:
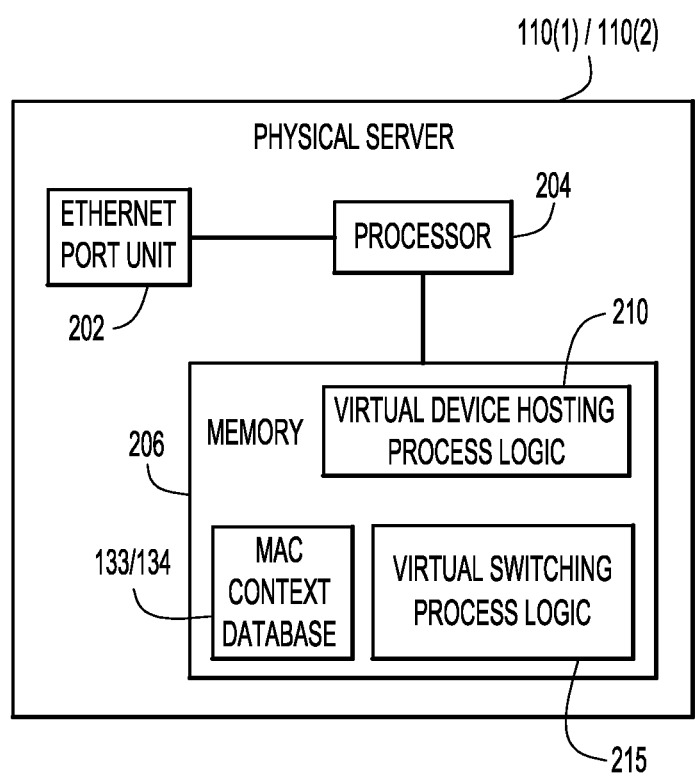
FIG. 2 shows an example block diagram of a physical server configured with virtual device hosting logic and virtual switching process logic to determine whether or not a packet originating from one of the virtual machines should be forwarded to another one of the virtual machines or another physical server or client device in a same layer 2 network.

Reference is now made to FIG. 2. FIG. 2 shows a physical server 110(1)/110(2) configured with an Ethernet port unit 202, a processor 204 and memory 206. The physical server 110(1)/110(2) is configured to send and receive data communications (e.g., data packets) from corresponding physical switches 104(1)/104(2) at the Ethernet port unit 202. The Ethernet port unit 202 is coupled to the processor 204. The processor 204 is a microprocessor or microcontroller that is configured to execute program logic instructions (i.e., software) for carrying out various operations and tasks described herein. For example, the processor 204 is configured to execute the virtual device hosting process logic 210 that is stored in the memory 206 to host virtual devices in the primary VLAN 1000 and the secondary PVLANs, described above. The processor 204 is also configured to execute the virtual switching process logic 215 that are stored in the memory 206 to determine whether or not to forward packet communications received from a host virtual machine hosted by the physical server 110(1)/110(2). The functions of the processor 204 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 206 may comprise read only memory (ROM), random access memory (RAM), magnetic disk storage media devices, optical storage media devices, flash memory devices, electrical, optical, or other physical/tangible memory storage devices. The memory 206 stores software instructions for the virtual device hosting process logic 210 to host the virtual devices. Additionally, the memory 206 stores software instructions for the virtual switching process logic 215 and also stores the virtual context database 133 that maps MAC address associated with vNICs of virtual devices hosted by the physical server 110(1)/110(2). Thus, in general, the memory 206 may comprise one or more computer readable storage media (e.g., a memory storage device) encoded with software comprising computer executable instructions and when the software is executed (e.g., by the processor 204) it is operable to perform the operations described for virtual device hosting process logic 210 and the virtual switching process logic 215.

The virtual device hosting process logic 210 and the virtual switching process logic 215 may take any of a variety of forms, so as to be encoded in one or more tangible computer readable memory media or storage device for execution, such as fixed logic or programmable logic (e.g., software/computer instructions executed by a processor), and the processor 204 may be an application specific integrated circuit (ASIC) that comprises fixed digital logic, or a combination thereof.

For example, the processor 204 may be embodied by digital logic gates in a fixed or programmable digital logic integrated circuit, which digital logic gates are configured to perform the virtual device hosting process logic 210 and the virtual switching process logic 215. In general, the virtual device hosting process logic 210 and the virtual switching process logic 215 may be embodied in one or more computer readable storage media encoded with software comprising computer executable instructions and when the software is executed operable to perform the operations described hereinafter.

In general, as stated above, the physical servers are configured to host virtual devices in a primary VLAN 1000. These virtual devices may be subdivided into secondary VLANs or PVLANs. VMs within the primary VLAN 1000 hosted by the physical servers may attempt to send communications to each other (e.g., data packets). These communications may be "permissible" communications or may be "impermissible" communications, based on the assignment of VMs within the primary VLAN and secondary VLAN landscape.

In one example, at times, VM1 124(1) in PVLAN 1001 may attempt to send "permissible" data packets to VM2 124(2) residing in the same community PVLAN 1001. At other times, VM1 124(1) in PVLAN 1001 may attempt to send "impermissible" data packets to VM3 124(3) residing in a different community PVLAN 1002 or to VM5 124(5) residing in the isolated PVLAN 1003. These data packets are impermissible since the source VM and destination VM reside in different community PVLANs. The virtual switches, thus, need to ensure that permissible data packets are routed to appropriate destination VMs, while impermissible data packets are dropped and not sent to impermissible destination VMs or to physical devices that host the impermissible destination VMs.

To accomplish this, a virtual switch can evaluate received packets to obtain source MAC addresses associated with the vNICs of source VMs and destination MAC addresses associated with vNICs of destination VMs. These source MAC addresses and destination MAC addresses are then compared to mapping information obtained by the virtual switch from the virtual MAC context database 133. As stated above, the controller 130 may update the MAC context database if VMs migrate to other secondary VLANs. Thus, if a virtual switch disconnects from the controller 130 (sometimes referred to as "headless mode"), the virtual switch may no longer be privy to this updated MAC address information.

After comparing the source MAC addresses and destination MAC addresses to the mapping information obtained from the virtual MAC context database 133, the virtual switch can determine whether or not the received packets are "permissible" communications. For example, the virtual switch can use the mapping information to perform a logical check to determine whether or not the source VM associated with the source MAC address resides within the same PVLAN as the destination VM associated with the destination MAC address. Based on this evaluation, the virtual switch can decide whether to forward the packet, if permissible, or to drop the packet, if impermissible, as described hereinafter.

Reference is now made to FIG. 3. FIG. 3 shows an example of the mapping information residing in the virtual MAC context database 133. The mapping information, for example, comprises the MAC address associated with all of the virtual devices that are located in the VLAN 1000, including the VMs 124(1)-124(7), first virtual switch 120(1), second virtual switch 120(2) and controller 130. The mapping information maps these MAC addresses to corresponding vNIC cards of these virtual devices and also to respective primary and secondary VLAN groups of the virtual devices. For simplicity, FIG. 3 depicts mapping information for the VMs 124(1)-124(7) only.

For example, the first MAC address listed in the database 133 is associated with VM1 124(1), the second MAC address is associated with VM2 124(2), and so on. As shown, the mapping information in the database 133 maps the MAC addresses of the VMs to the corresponding vNICs, primary VLANs and secondary VLANs. All of the VMs have MAC addresses that are mapped to the same primary VLAN since they all reside within primary VLAN 1000. Additionally, VMs 124(1), 124(2), 124(6) and 124(7) have MAC addresses that are mapped to secondary VLAN/PVLAN 1001, VMs 124(3) and 124(4) have MAC addresses that are mapped to secondary VLAN/PVLAN 1002 and VM 124(5) has a MAC address that is mapped to secondary VLAN/PVLAN 1003. As stated above in connection with FIG. 1, one or more of these VMs may migrate or be reassigned to a different PVLAN group. When this happens, the mapping information in the virtual MAC context database 133 is updated accordingly to reflect this reassignment.

When the virtual switches 120(1) and 120(2) have access to the mapping information in the virtual MAC context database 133, the virtual switches 120(1) and 120(2) identify whether or not a packet received from a source VM has a "permissible" or "impermissible" destination VM by checking whether the source VM is "allowed" to communicate with the destination VM. Often times, however, one of the virtual switches may no longer receive updated MAC address information associated with the VMs. For example, as shown in FIG. 1, the second virtual switch 120(2) may disconnect from controller 130 (which updates the virtual MAC context database 133). Thus, the virtual switch 120(2) may be left with outdated or "stale" mapping information. If one or more VMs subsequently migrate or are reassigned to new PVLANs, the virtual switch 120(2) with the stale mapping information may not receive updates to the virtual MAC context database 133 that indicates the VMs reassignment to the different PVLAN group.

Figure 4:
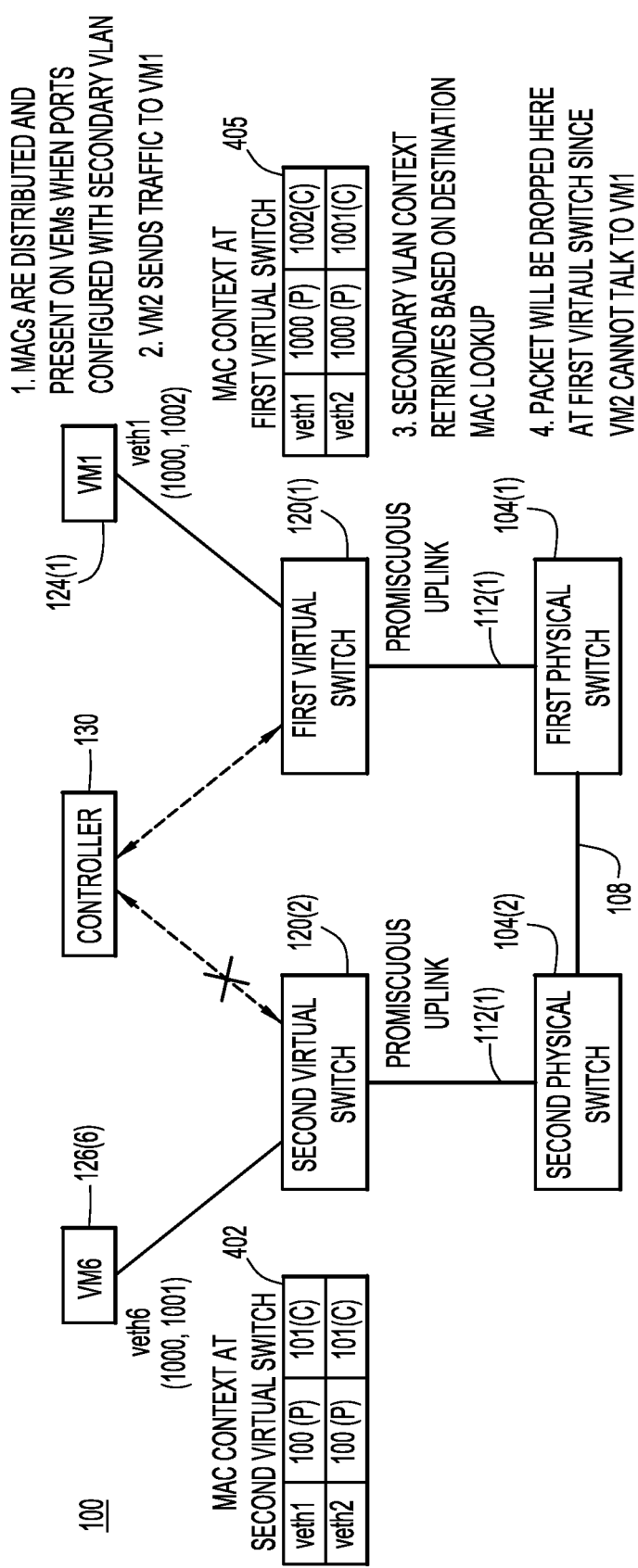
FIG. 4 shows an example schematic depicting one of the virtual switches disconnecting from a virtual controller device.

FIG. 4 schematically demonstrates this problem. FIG. 4 shows a simplified version of topology 100, described above in connection with FIG. 1. In FIG. 4, VM1 124(1) is connected to the first virtual switch 120(1), and VM6 124(6) is connected to the second virtual switch 124(6). Initially, the first virtual switch 120(1) and the second virtual switch 124(6) are connected to controller 130. Although not shown in FIG. 4, it should be appreciated that controller 130 is virtually connected to the first virtual switch 120(1) and the second virtual switch 120(2), as described above. VM1 124(1) and VM6 124(6) reside in the primary VLAN 1000 and initially reside in the secondary VLAN 1001, also as described above.

Thus, initially, for data communications originating from VM1 124(1) and destined from VM6 124(6), data packets are sent from VM1 124(1) to the first virtual switch 120(1) in PVLAN 1001 (e.g., the PVLAN to which the source VM belongs). The first virtual switch 120(1) evaluates the packets to obtain the source MAC address information and the destination MAC address information and checks to see whether the packets are "permissible" or "impermissible." Since VM1 124(1) and VM6 124(6) (initially) reside in the same PVLAN 1001 (i.e., the data packets are "permissible"), the first virtual switch 120(1) sends these data packets to the first physical switch 104(1) (from the first physical server 110(1)) in VLAN 1000 across physical link 112(1). The first physical switch 104(1) sends these packets to the second physical switch 104(2) in VLAN 1000 across physical link 108. The second physical switch 104(2) then sends these packets to the second virtual switch 120(2) (e.g., residing in the second physical server 110(2)) along the physical link 112(1) in VLAN 1000. Finally, the second virtual switch 120(2), after evaluating the packet to determine the destination MAC address, forwards the packet to VM6 124(6) in PVLAN 1001.

However, as stated above, virtual switches may disconnect from the controller 130 and VMs may be reassigned to new secondary PVLANs. In FIG. 4, the second virtual switch 120(2) disconnects from controller 130. As a result, the second virtual switch 120(2) may not have access to updates to the virtual MAC context database 133. Thus, since the second virtual switch 120(2) does not have the most up-to-date MAC address information, the second virtual switch 120(2) has only outdated or stale mapping information, shown at reference numeral 402. FIG. 4 shows VM1 124(1) subsequently migrating to a new PVLAN 1002. In this example, the outdated mapping information 402 is not updated at the second virtual switch 120(2). The updated mapping information is, however, updated at the first virtual switch 120(1) since the first virtual switch 120(1) still receives the updated mapping information from the virtual MAC context database 133 via controller 130 as this information is updated.

Thus, when VM1 124(1) attempts to send data communications to VM6 124(6), the first virtual switch 120(1) (still virtually connected to controller 130) evaluates packets of the data communication for the source MAC address and the destination MAC address. The first virtual switch 120(1) obtains the most up-to-date mapping information, shown at reference numeral 405, from the virtual MAC context database 133 (via the controller 130) and determines that the data packets are "impermissible" (since VM1 124(1) and VM6 124(6) now belong to different PVLANs after VM1's migration). Accordingly, the first virtual switch 120(1) drops these packets without forwarding the packets to the first physical switch 104(1). Thus, the first virtual switch 120(1) prevents impermissible/unauthorized packets from being sent to other physical devices within LAN 100 (shown in FIG. 1) and instead, drops these packets at the first virtual switch 120(1) (hosted by the first physical server 110(1) before being sent within LAN 100. For example, the packets are not sent to the second physical server 110(2) (or any other intermediate physical device in LAN 100), which hosts the destination VM6 124(6).

Figure 5:
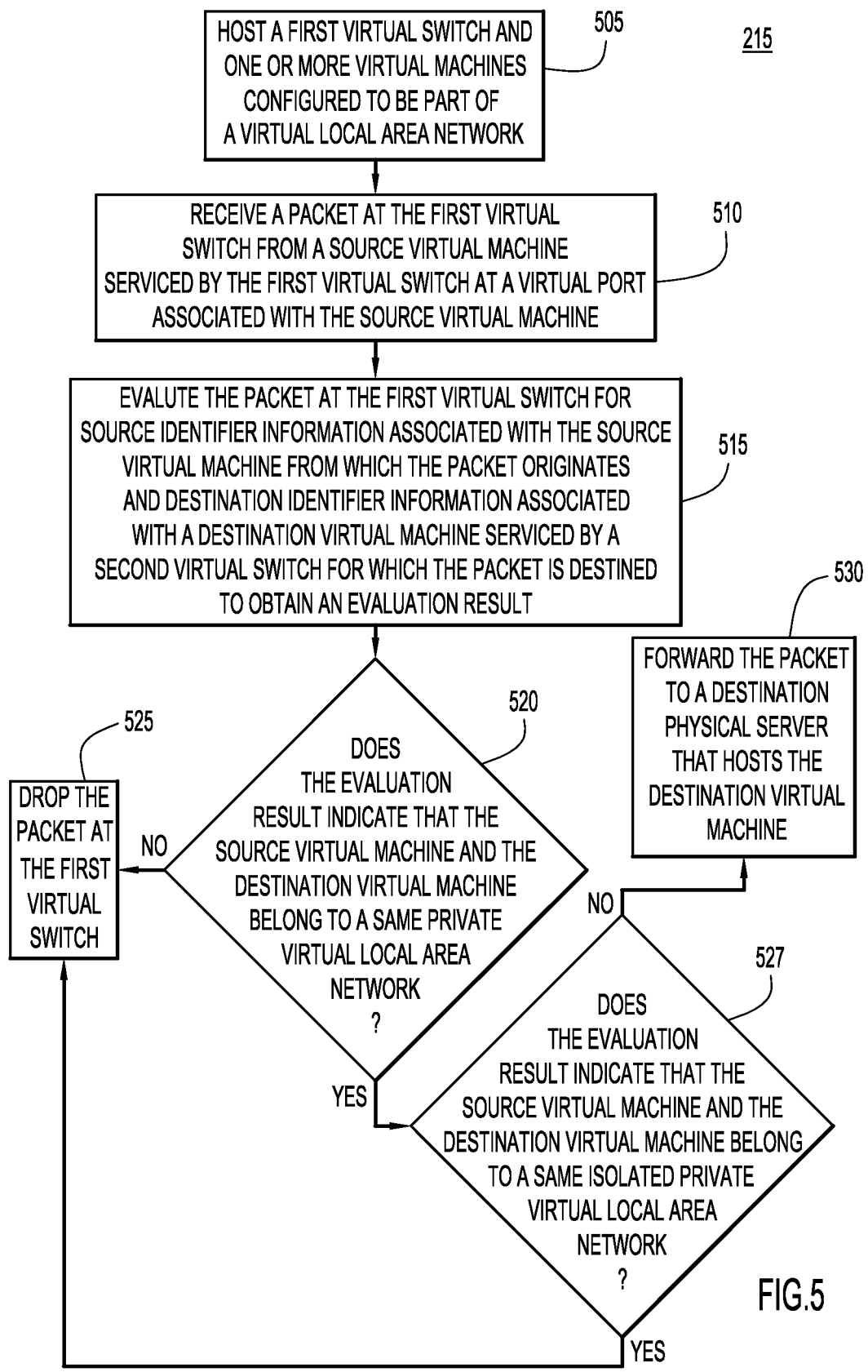
FIG. 5 shows an example flow chart depicting operations of the virtual switching process logic to determine whether or not a packet should be dropped at a source virtual switch.

Reference is now made to FIG. 5. FIG. 5 shows an example flow chart depicting operations of the virtual switching process logic 215 to determine whether or not a packet communication should be dropped at a source virtual switch. At operation 505, the first physical server 110(1) hosts the first virtual switch 120(1) and one or more VMs in a VLAN (e.g., VLAN 1000). At operation 510, the first virtual switch 120(1) receives a packet from a source VM (e.g., at a virtual port associated with the source VM) that is serviced by the first virtual switch 120(1). At operation 515, the packet is evaluated at the first virtual switch 120(1) for source identifier information associated with the source VM from which the packet originates and destination identifier information associated with a destination VM serviced by the second virtual switch 120(2) for which the packet is destined to obtain an evaluation result. A determination is made, at operation 520, as to whether the evaluation result indicates that the source VM and the destination VM belong to a same PVLAN. If the source VM and the destination VM do not belong to the same PVLAN, at operation 525, the packet is dropped at the first virtual switch 120(1). If the source VM and the destination VM do belong to the same PVLAN, the packet is forwarded, at operation 527, a determination is made as to whether the evaluation result indicates that the source VM and the destination VM belong to a same isolated PVLAN. If so, the process reverts to operation 525 to drop the packet at the first virtual switch, since VMs in the same isolated PVLAN are prohibited from sending packet communications to each other. If not, at operation 530, the packet is forwarded to a destination physical server (e.g., the second physical server 110(2)) that hosts the destination virtual machine.

Figure 6:
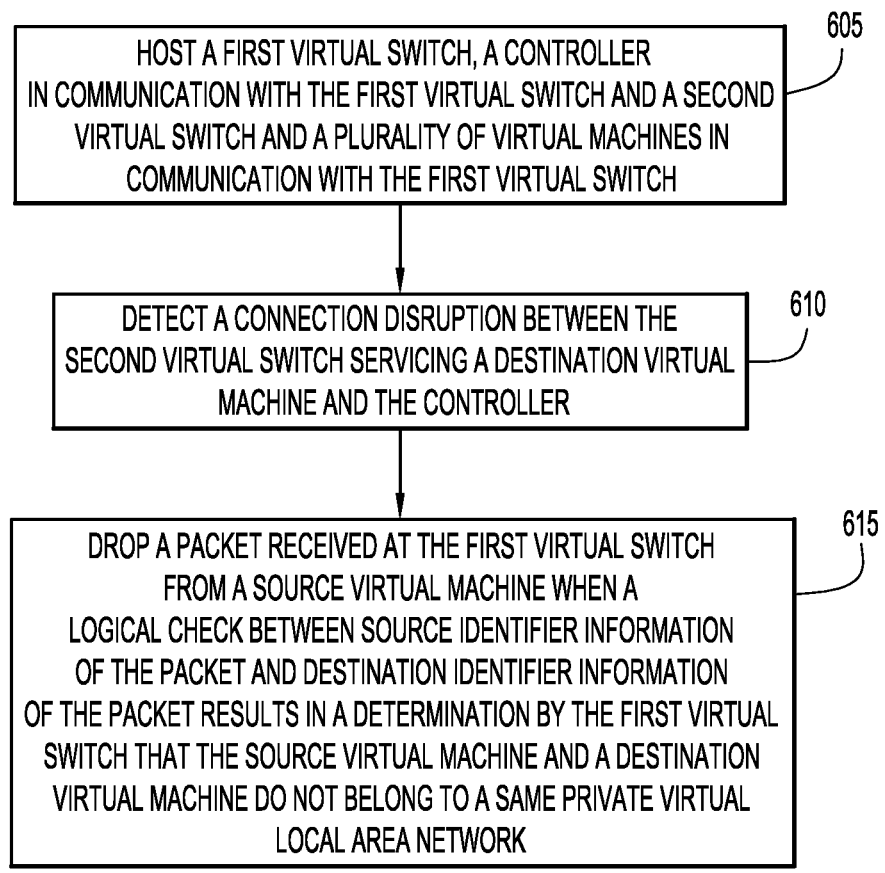
FIG. 6 shows an example flow chart depicting operations of the virtual switching process logic to detect when a virtual switch has disconnected from a virtual supervisor module.

Reference is now made to FIG. 6, which shows an example flow chart depicting operations of the virtual switching process logic 215 to detect when a virtual switch has disconnected from a controller. At operation 605, the first physical server 110(1) hosts the first virtual switch 120(1), a controller in communication with the first virtual switch 120(1) and the second virtual switch 120(2) and a plurality of VMs in communication with the first virtual switch 120(1). At operation 610, a connection disruption is detected between the second virtual switch 120(2) and the controller. Packets received at the first virtual switch 120(1) from one of the virtual machines are dropped, at operation 615, at the first virtual switch 120(1) when a logical check between source identifier information of the packets and destination identifier information of the packets results in a determination by the first virtual switch 120(1) that a source VM and a destination VM do not belong to a same PVLAN.

It should be appreciated that the controller 130 may also operate to control or manage MAC context database information between the physical switches 104(1) and 104(2) in a similar manner to the techniques described above. For example, the controller 130 or a new physical controller (shown as reference numeral 150 in FIG. 1) may be in communication with the first physical switch 104(1) and the first physical switch 104(2) to share mapping information (e.g., information in the MAC context database 114 and 115). Accordingly, the first physical switch 104(1) and the second physical switch 104(2) may be configured with similar switching logic as the first physical server 110(1) and the second physical server 110(2) to enable the first physical switch 104(1) and the second physical switch 104(2) perform similar switching and packet routing operations in LAN 100 described above with respect to the virtual devices in VLAN 1000.

It should be further appreciated that the techniques described above in connection with all embodiments may be performed by one or more computer readable storage media that is encoded with software comprising computer executable instructions to perform the methods and steps described herein. For example, the operations performed by the physical servers may be performed by one or more computer or machine readable storage media or device executed by a processor and comprising software, hardware or a combination of software and hardware to perform the techniques described herein.

In summary, a method is provided comprising: at a given physical server in a local area network comprising a plurality of physical servers, hosting a first virtual switch and one or more virtual machines configured to be part of a virtual local area network (VLAN), wherein the first virtual switch is configured to enable communication among the virtual machines which are arranged in one or more private VLANs (PVLANs); receiving a packet at the first virtual switch from a source virtual machine at a virtual port associated with the source virtual machine; evaluating the packet at the first virtual switch for source identifier information associated with the source virtual machine from which the packet originates and destination identifier information associated with a destination virtual machine serviced by a second virtual switch for which the packet is destined to obtain an evaluation result; determining based on the evaluation result, whether the source virtual machine and the destination virtual machine belong to a same PVLAN based on the source identifier information and the destination identifier information; and dropping the packet at the first virtual switch when the determining indicates that the source virtual machine and the destination virtual machine do not belong to the same PVLAN.

In addition, a method is provided comprising: at a given physical server in a local area network comprising a plurality of physical servers, hosting a first virtual switch, a virtual supervisor module in communication with the first virtual switch and a second virtual switch and a plurality of virtual machines configured to be part of a virtual local area network in communication with the first virtual switch; detecting a connection disruption between the second virtual switch servicing a destination virtual machine and the virtual supervisor module; and dropping a packet received at the first virtual switch from a source virtual machine when a logical check between source identifier information of the packet and destination identifier information of the packet determines that a source virtual machine and a destination virtual machine do not belong to a same private virtual local area network.

Furthermore, one or more computer readable storage media is provided with software comprising computer executable instructions and when the software is executed operable to: host a first virtual switch and one or more virtual machines configured to be part of a virtual local area network (VLAN), wherein the first virtual switch is configured to enable communications among the virtual machines which are arranged in one or more private VLANs (PVLANs); receive a packet at the first virtual switch from a source virtual machine at a virtual port associated with the source virtual machine; evaluate the packet at the first virtual switch for source identifier information associated with the source virtual machine from which the packet originates and destination identifier information associated with a destination virtual machine serviced by a second virtual switch for which the packet is destined to obtain an evaluation result; determine based on the evaluation result, whether the source virtual machine and the destination virtual machine belong to a same PVLAN based on the source identifier information and the destination identifier information; and drop the packet at the first virtual switch when the determining indicates that the source virtual machine and the destination virtual machine do not belong to the same PVLAN.

In addition, an apparatus is provided comprising: an Ethernet port unit; a memory unit comprising a media access control database; and a processor coupled to the Ethernet port unit and the memory and configured to: host a first virtual switch and one or more virtual machines configured to be part of a virtual local area network (VLAN), wherein the first virtual switch is configured to enable communications among the virtual machines which are arranged in one or more private VLANs (PVLANs); receive a packet at the first virtual switch from a source virtual machine serviced by the first virtual switch at a virtual port associated with the source virtual machine; evaluate the packet at the first virtual switch for source identifier information associated with the source virtual machine from which the packet originates and destination identifier information associated with a destination virtual machine for which the packet is destined to obtain an evaluation result; determine based on the evaluation result, whether the source virtual machine and the destination virtual machine belong to a same PVLAN based on the source identifier information and the destination identifier information; and drop the packet at the first virtual switch when the determining indicates that the source virtual machine and the destination virtual machine do not belong to the same PVLAN.

The above description is intended by way of example only. Various modifications and structural changes may be made therein without departing from the scope of the concepts described herein and within the scope and range of equivalents of the claims.

What is claimed is:

1. A method comprising:
   at a given physical server in a local area network comprising a plurality of physical servers, hosting a first virtual switch and one or more virtual machines configured to be part of a virtual local area network (VLAN), wherein the first virtual switch is configured to enable communications among the virtual machines which are arranged in one or more private VLANs (PVLANs);

receiving a packet at the first virtual switch from a source virtual machine serviced by the first virtual switch at a virtual port associated with the source virtual machine;

at the first virtual switch, communicating with a controller to obtain source identifier information associated with the source virtual machine from which the packet originates and destination identifier information associated with a destination virtual machine serviced by a second virtual switch for which the packet is destined;

evaluating the packet at the first virtual switch for the source identifier information and the destination identifier information to obtain an evaluation result, wherein evaluating comprises obtaining source media access control (MAC) address information that identifies the VLAN and PVLAN to which the source virtual machine belongs and obtaining destination MAC address information that identifies the VLAN and PVLAN to which the destination virtual machine belongs;

determining based on the evaluation result, whether the source virtual machine and the destination virtual machine belong to a same PVLAN based on the source identifier information and the destination identifier information;

dropping the packet at the first virtual switch when the determining indicates that the source virtual machine and the destination virtual machine do not belong to the same PVLAN so that the packet is not sent to the second virtual switch; and communicating with the controller to obtain the source MAC address information associated with the source virtual machine and the destination MAC address information associated with the destination virtual machine.

2. The method of claim 1, wherein determining comprises performing a logical check between the source identifier information and the destination identifier information to determine whether the source virtual machine and the destination virtual machine belong to the same PVLAN.

3. The method of claim 2, wherein performing comprises performing the logical check based on a primary VLAN and a secondary VLAN associated with the source virtual machine and the destination virtual machine, wherein the primary VLAN indicates the VLAN of the one or more virtual machines and the secondary VLAN indicates a source PVLAN and a destination PVLAN associated with the source virtual machine and the destination virtual machine, respectively.

4. The method of claim 1, wherein receiving comprises receiving the packet via an Ethernet connection between the virtual port of the first virtual switch and the source virtual machine.

5. The method of claim 1, wherein obtaining the source MAC address and the destination MAC address comprises evaluating port configurations of the first virtual switch that manages the source virtual machine and port configurations of the second virtual switch.

6. The method of claim 1, further comprising dropping the packet at the first virtual switch when the determining indicates that the source virtual machine and the destination virtual machine belong to the same PVLAN designated as an isolated PVLAN.

7. A method comprising:
at a given physical server in a local area network comprising a plurality of physical servers, hosting a first virtual switch, a controller in communication with the first virtual switch and a second virtual switch and a plurality of virtual machines in communication with the first virtual switch configured to be part of a virtual local area network;

at the first virtual switch, obtaining from the controller source identifier information of a packet sent by a source virtual machine and destination identifier information of the packet associated with a destination virtual machine to which the packet is destined;

detecting, by the controller, a connection disruption between the second virtual switch servicing the destination virtual machine and the controller; and at the first virtual switch, dropping the packet so that the packet is not sent to the second virtual switch when a logical check between the source identifier information of the packet and the destination identifier information of the packet results in a determination by the first virtual switch that the source virtual machine and the destination virtual machine do not belong to a same private virtual local area network (PVLAN), wherein the logical check is based on a primary VLAN and a secondary VLAN associated with the source virtual machine and the destination virtual machine, wherein the primary VLAN indicates the VLAN of the plurality of virtual machines and the secondary VLAN indicates a source PVLAN and a destination PVLAN associated with the source virtual machine and the destination virtual machine, respectively.

8. The method of claim 7, wherein dropping comprises dropping the packet based on identifying source media access control (MAC) address information of the source virtual machine and MAC address information of the destination virtual machine.

9. The method of claim 7, further comprising dropping the packet at the first virtual switch when the logical check results in the determination by the first virtual switch that the source virtual machine and the destination virtual machine belong to the same PVLAN designated as an isolated PVLAN.

10. A readable storage device encoded with software comprising computer executable instructions and when the software is executed operable to:
host a first virtual switch and one or more virtual machines configured to be part of a virtual local area network (VLAN), wherein the first virtual switch is configured to enable communications among the virtual machines which are arranged in one or more private VLANs (PVLANs);

receive a packet at the first virtual switch from a source virtual machine serviced by the first virtual switch at a virtual port associated with the source virtual machine;

at the first virtual switch, communicate with a controller to obtain source identifier information associated with the source virtual machine from which the packet originates and destination identifier information associated with a destination virtual machine serviced by a second virtual switch for which the packet is destined;

evaluate the packet at the first virtual switch for the source identifier information and the destination identifier information to obtain an evaluation result;

determine based on the evaluation result, whether the source virtual machine and the destination virtual machine belong to a same PVLAN based on the source identifier information and the destination identifier information; and drop the packet at the first virtual switch when the determining indicates that the source virtual machine and the destination virtual machine do not belong to the same PVLAN so that the packet is not sent to the second virtual switch, wherein the instructions operable to determine comprise instructions operable to perform a logical check between the source identifier information and the destination identifier information to determine whether the source virtual machine and the destination virtual machine belong to the same PVLAN, and wherein the instructions operable to perform comprise instructions operable to perform the logical check based on a primary VLAN and a secondary VLAN associated with the source virtual machine and the destination virtual machine, wherein the primary VLAN indicates the VLAN of the one or more virtual machines and the secondary VLAN indicates a source PVLAN and a destination PVLAN associated with the source virtual machine and the destination virtual machine, respectively.

11. The computer readable storage device of claim 10, wherein the instructions operable to evaluate comprise instructions operable to obtain source media access control (MAC) address information that identifies the VLAN and PVLAN to which the source virtual machine belongs and obtaining destination MAC address information that identifies the VLAN and PVLAN to which the destination virtual machine belongs.

12. The computer readable storage device of claim 10, further comprising instructions operable to drop the packet at the first virtual switch it is determined that the source virtual machine and the destination virtual machine belong to the same PVLAN designated as an isolated PVLAN.

13. An apparatus comprising:
an Ethernet port unit;
a memory unit comprising a media access control database; and
a processor coupled to the Ethernet port unit and the memory unit and configured to:
host a first virtual switch and one or more virtual machines configured to be part of a virtual local area network (VLAN), wherein the first virtual switch is configured to enable communications among the virtual machines which are arranged in one or more private VLANs (PVLANs);
receive a packet at the first virtual switch from a source virtual machine serviced by the first virtual switch at a virtual port associated with the source virtual machine;
at the first virtual switch, communicate with a controller to obtain source identifier information associated with the source virtual machine from which the packet originates and destination identifier information associated with a destination virtual machine serviced by a second virtual switch for which the packet is destined;
evaluate the packet at the first virtual switch for the source identifier information and the destination identifier information to obtain an evaluation result;
determine based on the evaluation result, whether the source virtual machine and the destination virtual machine belong to a same PVLAN based on the source identifier information and the destination identifier information; and
drop the packet at the first virtual switch when the determining indicates that the source virtual machine and the destination virtual machine do not belong to the same PVLAN so that the packet is not sent to the second virtual switch,
wherein the processor is further configured to perform a logical check between the source identifier information and the destination identifier information to determine whether the source virtual machine and the destination virtual machine belong to the same PVLAN, and
wherein the processor is further configured to perform the logical check based on a primary VLAN and a secondary VLAN associated with the source virtual machine and the destination virtual machine, wherein the primary VLAN indicates the VLAN of the one or more virtual machines and the secondary VLAN indicates a source PVLAN and a destination PVLAN associated with the source virtual machine and the destination virtual machine, respectively.

14. The apparatus of claim 13, wherein the processor is further configured to drop the packet at the first virtual switch when the determining indicates that the source virtual machine and the destination virtual machine belong to the same PVLAN designated as an isolated PVLAN.

* * * * *